United States Patent Office 3,497,368
Patented Feb. 24, 1970

3,497,368
STRENGTHENING OF TRANSITION METAL CARBIDES TO WITHSTAND DEFORMATION AT HIGH TEMPERATURES
Wendell S. Williams, Parma, Ohio, assignor to Union Carbide Corporation, a corporation of New York
Filed June 2, 1964, Ser. No. 371,947
Int. Cl. C22c 29/00, 31/04; C04b 35/70
U.S. Cl. 106—43
8 Claims

ABSTRACT OF THE DISCLOSURE

A method for strengthening transition metal carbides to withstand deformation at high temperatures is described. Boron in an amount between about 0.5% and 5% is incorporated into the metal carbide in various ways causing a hardening of the carbides at high temperatures while not adversely affecting the room temperature character of the metal carbide so treated.

---

This invention relates in general to the strengthening of metals, and more particularly, to the strengthening of the transition metal carbides to withstand deformation at high temperatures.

While the invention relates to transition metal carbides in general, it refers more particularly to the carbides of the transition metals of Groups IV, V and VI, e.g. titanium, zirconium, hafnium; vanadium, niobium, tantalum; and chromium, molybdenum and tungsten, respectively.

Transition metal carbides are known to exhibit such favorable characteristics as a high melting point and a high room temperature hardness. Titanium carbide, for example, has a melting point of 3250° centigrade and a room temperature hardness of 3000 kilograms per square millimeter. However, the transition metal carbides are unable, in the pure state, to retain their desirable room temperature hardness characteristic as the temperature increases. As a result, the metal carbides soften at temperatures well below their melting point. This characteristic of these metal carbides renders them suitable for use in structural applications wherein the structure must withstand high temperatures as, for example, vehicles or devices designed to travel in space.

The principal object of this invention, therefore, is to provide a method for strengthening transition metal carbides to withstand deformation at high temperatures.

Another object of this invention is to provide a method for strengthening transition metal carbides to withstand deformation at high temperatures which method does not adversely affect the favorable room temperature hardness characteristic or high melting point of the transition metal carbides.

Still another object of this invention is to provide a method whereby transition metal carbides are rendered suitable for use in structures which must withstand deformation at high temperatures.

Broadly, the objects of the invention are accomplished by the addition of boron to a transition metal carbide. A boron bearing precipitate is formed by the reaction of boron with the metal carbide, the precipitation hardening of the metal carbide results. Since the precipitate is also a high temperature refractory compound, the system is stable to high temperatures. Furthermore, the extreme hardness at room temperature characteristic for the metal carbide is maintained.

The invention will be further illustrated in the accompanying drawings, wherein.

Figure 1:
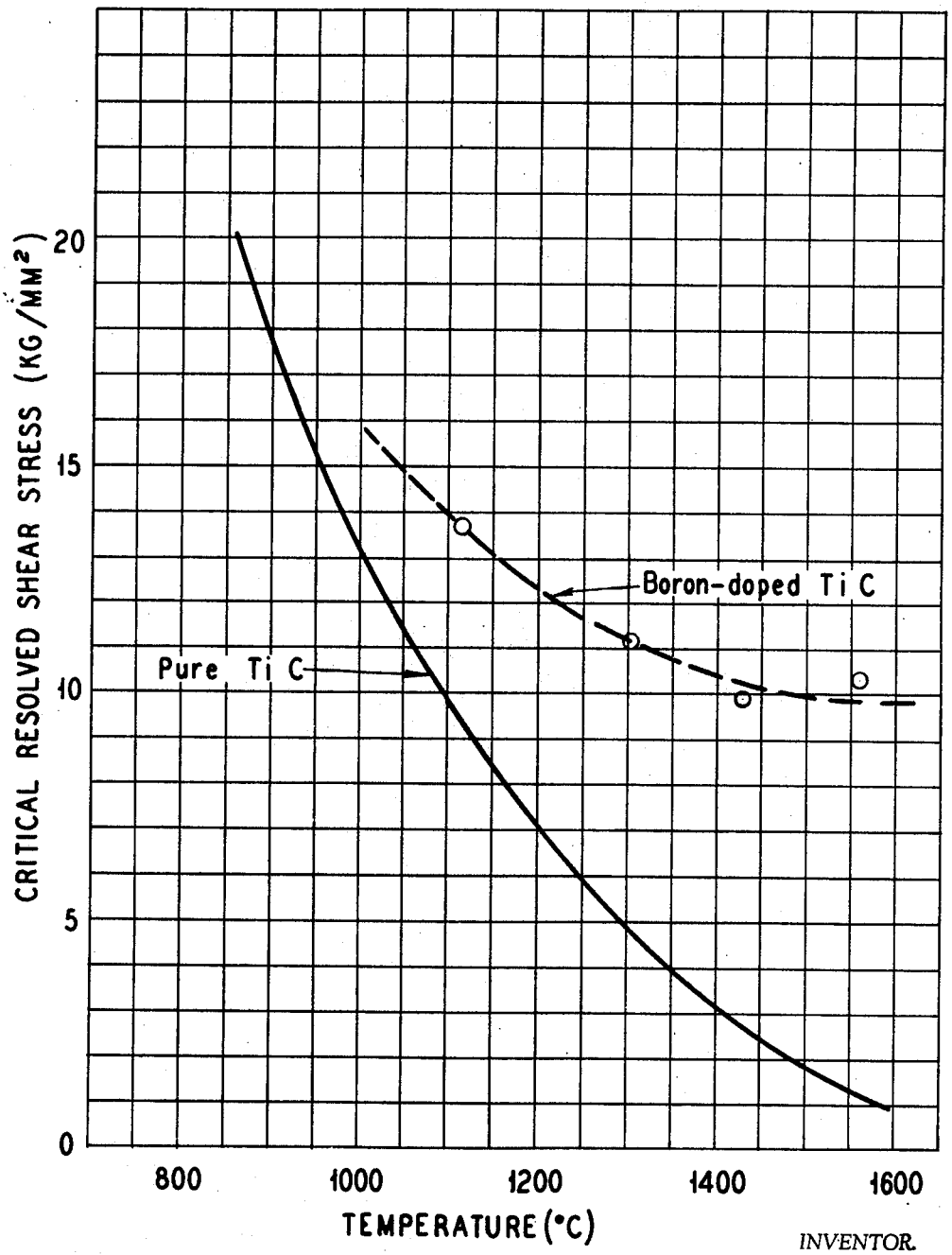
FIGURE 1 is a set of curves illustrating the relationship between temperature and the critical resolved shear stress for pure titanium carbide crystals and the boron doped crystals typical of the invention. The critical resolved shear stress is a quantity which is proportional to the yield stress and the hardness of the material.

In the practice of the invention, quantities of boron in the range between abut 0.5% and about 5% by weight of the transition metal carbide are preferred. Larger quantities of boron tend to impart greater room temperature hardness and convert a single crystal to a polycrystalline solid, but do not impart the favorable characteristics which are typical of the invention. Adding mere traces of boron is not sufficient to accomplish the objects of the invention.

Boron may be added to the metal carbide by any of the well known methods which are used in the art. One method which may be used in the practice of the invention is exposing the metal carbide while it is hot, that is, heated to a temperature of about 1400° C. to 1600° C., to a boron-bearing atmosphere. This procedure will allow the boron to diffuse into the carbide and react with it to form a second phase which will precipitate coherently in the lattice and harden the material. This method is especially useful in structural applications, since the metal carbide may be heated and formed to a predetermined shape before subjecting it to the boron atmosphere. Another suitable method of combining the boron with the metal carbide is to sprinkle the boron on the surface of the metal carbide then to heat the metal carbide to a temperature of between about 1600° C. to 2000° C. in a vacuum for a prescribed length of time. A third suitable method is to heat the metal carbide to a temperature of from about 1500° C. to 2000° C. in a crucible which had been previously exposed to boron.

The methods of combining the boron with a transition metal carbide are more clearly illustrated by the following examples.

EXAMPLE 1

High purity crystals of titanium carbide are combined with boron by exposing the crystals in an atmosphere of boron trichloride gas at approximately 1500° C. for approximately one hour. The amount of boron which is absorbed by the crystal is measured to be approximately 1% by weight of the titanium carbide crystal.

EXAMPLE 2

High purity crystals of titanium carbide with dimensions of ¼″ diameter by ½ centimeter length and ½″ diameter by 1 centimeter length were combined with boron. The boron was added to the crystals by sprinkling boron powder on the surface of the crystal and the crystal was then heated in a vacuum at 1800° C for 30 minutes. The amount of boron which was added to the crystals was measured to be approximately 1% by weight of the titanium carbide crystals.

EXAMPLE 3

Boron was added to a titanium carbide crystal having dimensions similar to those which are indicated in Example 2, by heating the crystals at 2000° C. for one hour in a tungsten crucible which had been previously exposed to boron. The source of boron in this test was beta tungsten boride ($W_2B$) which was found by X-ray diffraction to be present in the tungsten crucible. The amount of boron which was absorbed by the crystal was measured to be approximately 1% by weight of the titanium carbide crystal.

After the boron has been added to the titanium carbide by any of the above-mentioned methods, the success of the invention may be conveniently demonstrated. For example, the crystals which were prepared by the methods indicated in Examples 2 and 3 were tested in an apparatus designed to provide information with respect to the critical resolved shear stress of the crystals over the temperature range of 800° C to 1600° C. A similar relationship of critical resolved shear stress and temperature over the same temperature range and in the same apparatus was obtained for pure titanium carbide crystals. The results are illustrated in FIG. 1.

FIG. 1 compares the data obtained for pure titanium carbide crystals with that of titanium carbide crystals to which boron has been added. The data clearly illustrate that the boron-doped TiC crystals retain their hardness characteristic at elevated temperatures to a much greater extent than do the pure TiC crystals. At 1550° C., for example, the ratio of critical resolved shear stress of the boron doped crystals to the pure crystals is approximately seven to one, thereby illustrating the extreme effectiveness of the boron-doping phenomenon.

To further illustrate the effectiveness of the invention, the hot-pressing temperatures required for consolidation of a sample of pure TiC powder and a sample of TiC powder containing boron were compared. The boron bearing powder particles were shown by microscopic analysis to contain coherent precipitates of the same kind as found in the boron-doped single crystals of TiC. The amount of boron added to the TiC powder was between the range of from about 1% to about 2% by weight of the TiC powder.

The hot pressing test included placing each sample of powder in separate carbon tubes, applying a constant pressure to each sample by means of hydraulically operated rams, gradually increasing the temperature of the powder, and recording the position of the ram at various intervals of time.

Figure 2:
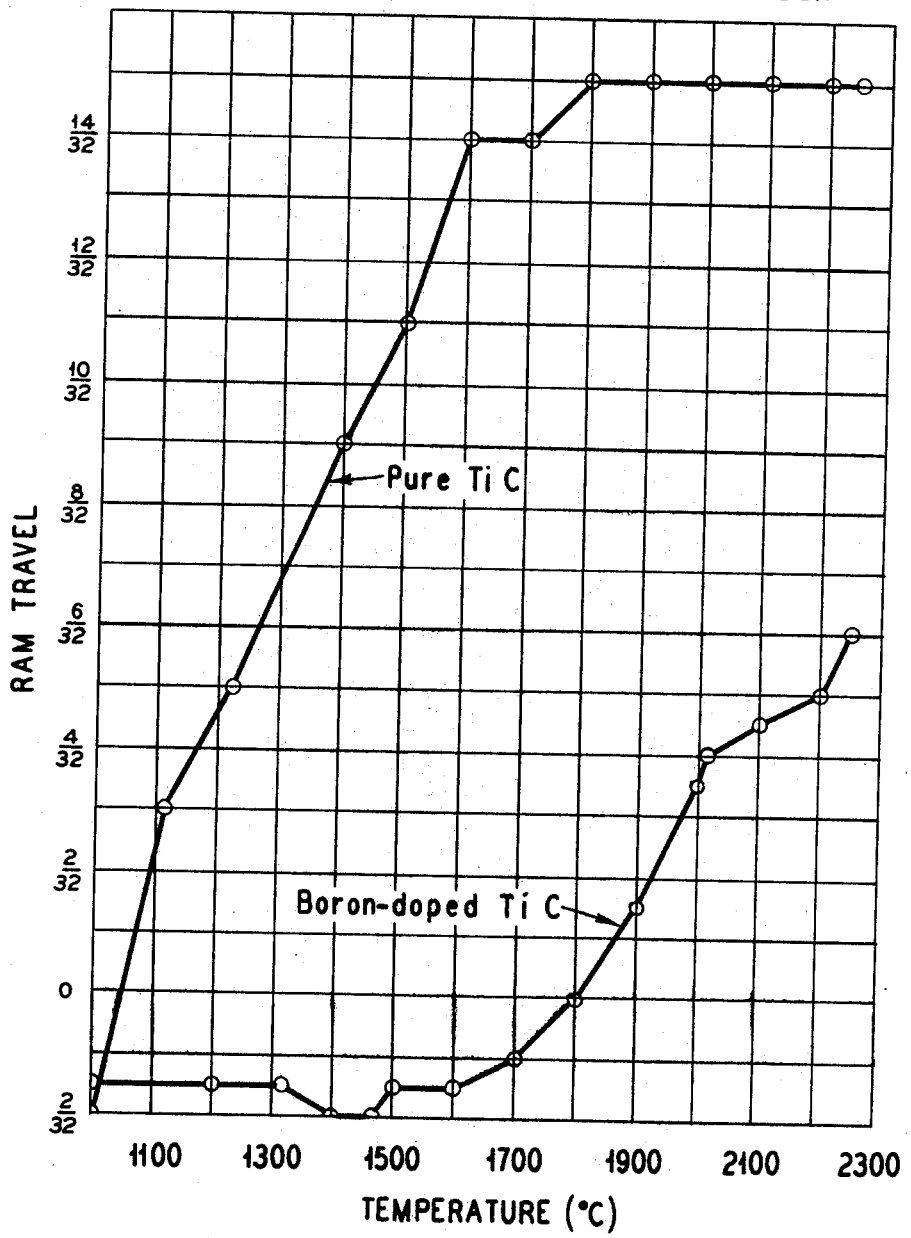
FIGURE 2 is a set of curves illustrating the relationship between temperature and ram travel for pure titanium carbide powder and titanium carbide powder containing boron. Ram travel is a quantity which is proportional to the degree of compaction of the powder.

FIG 2 illustrates the results of the test by comparing the temperatures at which consolidation due to plastic flow began for the two samples. The degree of compaction of the powder may be measured along the ordinate in terms of ram travel. The portion of the curve which falls below the zero line with respect to the ordinate is indicative of the temperatures at which the powder samples are in a state of thermal expansion. An examination of the curves indicates that the TiC powder containing the boron is consolidated at a substantially higher temperature than is the pure TiC powder. Traversing the curves from left to right will once again illustrate that the titanium carbide with boron added retains its hardness characteristic to a higher temperature than does the pure titanium carbide.

It will be appreciated that although the foregoing tests specifically recite titanium carbide, similar results will also be experienced with other transition metal carbides.

It is apparent that various changes arnd modifications may be made in the previous examples without departing from the nature of the invention. The previous examples are thus only illustrative of this invention and are not intended to indicate the ranges of operation. The upper limit of 1550° C., for example, which is recorded in FIG. 1 is a function of the operation of the apparatus which is used in the test and is by no means absolutely indicative of the upper temperature limit of effectiveness of the invention. It is believed that the transition metal carbide will remain in a strengthened condition for several hundred degrees beyond 1550° C. In addition, the quantities of boron which were added in the examples are merely set forth for illustrative purposes and are not intended to be absolute limits.

In addition to demonstrating the invention, the foregoing tests manifest another useful advantage of the invention, that is, that the moderate temperature at which the pure metal carbide softens may be fully exploited such that the metal carbide may be molded into any desired shape at this temperature and in addition, the thus preformed metal carbide may then be subjected to the strengthening phenomenon of the invention by the addition of boron, thereby providing a strengthened structure for higher temperatures. In this way an intricately shaped structural device which must resist softening at high temperatures may be easily and economically obtained.

Th precipitate which forms is believed to be a diboride of the transition metal. A typical reaction using titanium as the transition metal, therefore, may be conveniently demonstrated as follows:

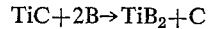

$$TiC + 2B \rightarrow TiB_2 + C$$

The precipitate, $TiB_2$, exhibits those favorable characteristics which have been hereinbefore discussed. The carbon which is released is believed to be useful in lowering the resistivity of the material. The carbon atoms which are released are free to fill the vacant lattice sites. Since resisitvty of the carbide is directly related to carbon vacancy concentration, a reduction in the carbon vacancy concentration will reduce the resistivity of the carbide.

What is claimed is:

1. A method whereby a preformed transition metal carbide is strengthened to withstand deformation at high temperatures consisting essentially of sprinkling boron on the surface of said transition metal carbide in an amount between about 0.5% and 5% by weight of the transition metal carbide, and heating said transition metal carbide and said boron in a vacuum at a temperature in the range of from about 1600° C. to 2000° C. for a time sufficient for said boron to be absorbed by said transition metal carbide.

2. The method of claim 1 wherein said transition metal carbide is titanium carbide.

3. A method whereby a preformed transition metal carbide is strengthened to withstand deformation at high temperatures consisting essentially of heating said preformed transition metal carbide to a temperature in the range of from tbout 1400° C. to about 1600° C. and exposing said transition metal carbide to a boron bearing atmosphere for a time sufficient for said transition metal carbide to absorb boron in an amount between about 0.5% to 5% based on the weight of the transition metal carbide.

4. The method of claim 3 wherein said boron bearing atmosphere is boron trichloride gas.

5. The method of claim 3 wherein said transition metal carbide is titanium carbide.

6. A method whereby a performed transition metal carbide is strengthened to withstand deformation at high temperatures consisting essentially of (a) placing said preformed transition metal carbide in a crucible which had previously been exposed to boron; (b) heating said transition metal carbide in an inert atmosphere at a temperature in the range of from about 1500° C. to 2000° C. for a time sufficient for said preformed transition metal carbide to absorb boron in an amount between about 0.5% and 5% by weight of said transition metal carbide.

7. The method of claim 6 wherein said transition metal carbide is titanium carbide.

8. The method of claim 6 wherein said crucible is tungsten.

References Cited

UNITED STATES PATENTS

| | | | |
|---|---|---|---|
| 3,025,192 | 3/1962 | Lowe | 106—44 |
| 3,236,780 | 2/1966 | Ozarow | 106—44 |
| 2,084,349 | 6/1937 | Laise | 106—43 XR |
| 2,313,410 | 3/1943 | Walither | 117—227 |
| 2,806,800 | 9/1957 | Glaser | 106—43 |
| 2,814,566 | 11/1957 | Glaser | 106—43 |
| 3,031,340 | 4/1962 | Girardot | 117—227 |
| 3,316,062 | 4/1967 | Criscione et al. | 23—204 |
| 3,164,501 | 1/1965 | Beale et al. | 148—189 |

HELEN M. McCARTHY, Primary Examiner

U.S. Cl. X.R.

106—56